UNITED STATES PATENT OFFICE.

HENRY S. SPACKMAN, OF ARDMORE, AND ELLIS W. LAZELL, OF PHILADELPHIA, PENNSYLVANIA, ASSIGNORS TO HENRY S. SPACKMAN ENGINEERING COMPANY, OF PHILADELPHIA, PENNSYLVANIA, A CORPORATION OF NEW JERSEY.

CEMENTITIOUS MATERIAL.

No. 903,019.  Specification of Letters Patent.  Patented Nov. 3, 1908.

Application filed September 22, 1908. Serial No. 454,139.

*To all whom it may concern:*

Be it known that we, HENRY S. SPACKMAN, a resident of Ardmore, Montgomery county, and State of Pennsylvania, and ELLIS W. LAZELL, a resident of the city and county of Philadelphia, State of Pennsylvania, citizens of the United States, have made certain new and useful Inventions Relating to Cementitious Materials, of which the following is a specification.

This invention relates to cementitious materials, and relates more particularly to highly cementitious materials and to the preparation thereof by the incorporation of separately prepared calcium aluminate or similar accelerating material with hydraulic independently cementitious material such as natural cement compositions.

Hydraulic calcium aluminate compounds may be readily prepared by calcining suitable mixtures of finely ground lime and bauxite or other alumina compounds, such as kaolin or high alumina clays, high alumina slag and so forth, the materials being preferably combined in such proportions that from one to three molecules of lime are present to one molecule of alumina, sufficient lime being of course added to combine with the silica or other acid components which may be present in connection with the aluminous material added to form the mixture. Such mixed materials may be rendered hydraulic and given a very quick initial set when ground and mixed with water by calcining or sintering them, and if desired by subsequently fusing them in some cases which seems to give a slower initial set to aluminates containing approximately equivalent proportions of lime and alumina. It is of course understood that iron or similar material may be used in some cases to replace to some extent at least the alumina in this accelerating material, and that other earthy alkali material, such as magnesia and so forth, may be substituted for part at least of the lime combined therewith, such calcium aluminates and equivalent or substitute accelerating material being designated hydraulic earthy alkali accelerating compounds of alumina-like material.

Suitable proportions of hydraulic calcium aluminate or similar accelerating material and also if desired controlling material to effect the desired quickness of set and increase of strength may be added and incorporated at any time before utilization with the independently cementitious material comprising oxids, hydrates, or otherwise available lime or similarly acting earthy alkali material combining or capable of combining with hydraulic calcium aluminate and coöperating silicious material. The finely divided accelerating material may be added and incorporated by the workman before or after he gages the cementitious material, or it may be dissolved or incorporated in the gaging water; preferably however the accelerating and controlling material may be uniformly incorporated with the independently cementitious material so as to form a finely ground material convenient for transportation and utilization since it becomes immediately effective when the water is added thereto.

Many natural cements such as are produced by the calcination of argillaceous limestone to substantial decarborization, and which are also known as Roman and Rosendale cements may with advantage receive a suitable addition of this previously prepared accelerating material, from about two to five per cent. being usually sufficient for such purposes to give a very considerable increase in quickness of set and strength, especially when similar proportions of available lime are added or are present. Desirable cements of this character for ordinary purposes may comprise seventy to ninety per cent. of the original cement, ten to twenty per cent. of hydrated lime or other earthy alkali material (that is, free or loosely combined lime, magnesia, baryta, strontia and other material capable of combining with coöperating silicious material and calcium aluminate accelerating material) with which three to seven per cent. of the previously prepared hydraulic calcium aluminate accelerating material and one to three per cent. of calcium sulfate or other controlling material have been incorporated, an initial set as quick as fifteen minutes or as slow as several hours being thus attainable as desired. The incorporation of five to ten per cent. of calcium aluminate accelerating material, and if desired, up to five or ten per cent. of hydrated lime and one to three per cent. of calcium sulfate with independently cementitious material such as the low-limed natural cements of the Lehigh district gives very good compositions and causes very considerable increases in their sand strengths, especially at early periods.

As an illustration a composition containing ninety per cent. of such natural cement giving when tested with three parts of sand about 100 pounds at seven days and about 140 pounds at twenty-eight days after having been stored till considerable moisture was absorbed and having the following approximate composition, with which was incorporated ten per cent. of hydraulic calcium aluminate accelerating material having the following approximate composition:

|  | Natural cement. | Accelerator. |
|---|---|---|
| $SiO_2$ | 22.82 | 1.16 |
| $R_2O_3$ | 10.76 | 66.92 |
| CaO | 48.40 | 31.46 |
| MgO | 1.52 | .72 |
| Loss on ignition | 13.72 | .02 | gave when tested in accordance with the standard methods the following results: initial set two hours and thirty minutes; final set four hours and fifty minutes; tensile strength with three parts of sand at seven days 160 pounds, at twenty-eight days 230 pounds and at three months 250 pounds.

Another composition made from materials of approximately the same analyses incorporated in proportions of eighty percent. of natural cement, ten per cent. of hydrated lime, seven percent. of hydraulic calcium aluminate accelerator and three per cent. of calcium sulfate gave the following tests: initial set one hour fifty-five minutes; final set four hours; tensile strength with three parts of standard sand at seven days 210 pounds, at twenty-eight days 380 pounds and at three months 390 pounds. Another natural cement somewhat more finely ground when ninety parts were incorporated with five parts of hydrated lime and five parts of hydraulic calcium aluminate accelerator and tested with three parts of sand gave at one day 210 pounds, at seven days 360 pounds and at twenty-eight days 460 pounds. These compositions are also constant in volume when tested in steam and hot water, thus as indicated fulfilling the constant volume and sand strength requirements for standard Portland cement. The incorporation of a considerably larger proportion, such as ten to twenty-five per cent. or more of calcium aluminate accelerating material, for instance, to such cements containing available lime or the like or having the same added thereto produces cements having much greater strengths with sand than the original cements.

It is of course understood that cementitious mixtures comprising a considerable proportion of natural cement incorporated with Portland cement or other material may similarly have incorporated therewith from about two to twenty per cent. or more of separately prepared calcium aluminate or similar accelerator to increase their quickness of set and strength especially at early periods.

Having described the invention in this case which relates to natural cement compositions and which is a continuation of, that is, contains subject-matter taken from United States Patent application 394,916, filed September 27, 1907, in connection with a number of illustrative ingredients, proportions, formulas and methods of preparation, to the details of which disclosure the invention is not of course to be limited, what is claimed as new and what is desired to be secured by Letters Patent is set forth in the appended claims.

1. The hydraulic highly cementitious material fulfilling the constant volume and sand strength requirements for Portland cement comprising available lime and controlling material and consisting substantially of natural cement and between three and ten per cent. of incorporated separately prepared hydraulic calcium aluminate accelerating material.

2. The hydraulic highly cementitious material substantially fulfilling the constant volume and sand strength requirements for Portland cement consisting substantially of natural cement and between three and ten per cent. of incorporated separately prepared earthy alkali accelerating compounds rich in alumina-like material.

3. The hydraulic highly cementitious material substantially fulfilling the constant volume requirements for Portland cement consisting substantially of natural cement, a few per cent. of controlling material and between about two and twenty per cent. of incorporated hydraulic separately prepared calcium aluminate accelerating material.

4. The hydraulic highly cementitious material substantially fulfilling the constant volume requirements for Portland cement consisting substantially of natural cement and between about two and twenty per cent. of incorporated hydraulic separately prepared earthy alkali accelerating compounds rich in alumina-like material.

5. The highly cementitious material substantially fulfilling the constant volume and sand strength requirements for Portland cement comprising available lime and a considerable proportion of natural cement and comprising between about two and twenty per cent. of hydraulic separately prepared calcium aluminate accelerating material.

6. The highly cementitious material substantially fulfilling the constant volume and sand strength requirements for Portland cement comprising available earthy alkali material and a large proportion of natural cement and comprising between about two and twenty per cent. of incorporated separately prepared hydraulic earthy alkali accelerating compounds rich in alumina-like material.

7. The highly cementitious material comprising controlling material, available lime and a considerable proportion of natural cement and comprising between about two and twenty per cent. of incorporated separately prepared calcium aluminate accelerating material.

8. The highly cementitious material comprising controlling material, available earthy alkali material and a considerable proportion of natural cement and comprising between about two and twenty per cent. of incorporated separately prepared earthy alkali accelerating compounds rich in alumina-like material.

9. The highly cementitious material substantially fulfilling the constant volume and sand strength requirements for Portland cement comprising calcium sulfate controlling material, a considerable proportion of natural cement and between three and ten per cent. of incorporated separately prepared calcium aluminate accelerating material.

10. The highly cementitious material substantially fulfilling the constant volume and sand strength requirements for Portland cement comprising a few per cent. of calcium sulfate controlling material, a considerable proportion of natural cement and between three and ten per cent. of incorporated separately prepared earthy alkali accelerating compounds rich in alumina-like material.

11. The highly cementitious material comprising calcium sulfate and a considerable proportion of natural cement and comprising between about two and twenty per cent. of incorporated separately prepared calcium aluminate accelerating material.

12. The highly cementitious material comprising calcium sulfate and a considerable proportion of natural cement and comprising between about two and twenty per cent. of incorporated separately prepared earthy alkali accelerating compounds rich in alumina-like material.

13. The highly cementitious material comprising available lime and a considerable proportion of natural cement and comprising between about two and twenty per cent. of separately prepared calcium aluminate accelerating material.

14. The highly cementitious material comprising available earthy alkali material and a considerable proportion of natural cement and comprising between about two and twenty per cent. of separately prepared earthy alkali accelerating compounds rich in alumina-like material.

15. The highly cementitious material comprising natural cement and incorporated separately prepared calcium aluminate accelerating material.

16. The highly cementitious material comprising natural cement and incorporated separately prepared earthy alkali accelerating compounds rich in alumina-like material.

17. The highly cementitious material comprising available lime and a considerable proportion of natural cement and comprising a small proportion of separately prepared calcium aluminate accelerating material.

18. The highly cementitious material comprising available earthy alkali material and a considerable proportion of natural cement and comprising a small proportion of incorporated separately prepared earthy alkali accelerating compounds rich in alumina-like material.

19. The highly cementitious material comprising a considerable proportion of natural cement and a small proportion of incorporated separately prepared calcium aluminate accelerating material.

20. The highly cementitious material comprising a considerable proportion of natural cement and a small proportion of incorporated separately prepared earthy alkali accelerating compounds rich in alumina-like material.

21. The highly cementitious material comprising controlling material and a considerable proportion of natural cement and comprising a small proportion of incorporated separately prepared earthy alkali accelerating compounds rich in alumina-like material.

22. The highly cementitious material comprising controlling material and a considerable proportion of natural cement and comprising a small proportion of incorporated separately prepared calcium aluminate accelerating material.

HENRY S. SPACKMAN.
ELLIS W. LAZELL.

Witnesses:
Louis F. Schuck,
W. L. Wilson.